United States Patent
Hidaka

(10) Patent No.: US 12,307,142 B2
(45) Date of Patent: May 20, 2025

(54) INFORMATION PROCESSING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Daichi Hidaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/358,427

(22) Filed: Jul. 25, 2023

(65) Prior Publication Data

US 2024/0036787 A1 Feb. 1, 2024

(30) Foreign Application Priority Data

Jul. 29, 2022 (JP) ................................. 2022-122018

(51) Int. Cl.
*G06F 3/12* (2006.01)

(52) U.S. Cl.
CPC .......... *G06F 3/1254* (2013.01); *G06F 3/1205* (2013.01); *G06F 3/1229* (2013.01); *G06F 3/1258* (2013.01)

(58) Field of Classification Search
CPC .... G06F 3/1254; G06F 3/1205; G06F 3/1229; G06F 3/1258
See application file for complete search history.

(56) References Cited

U.S. PATENT DOCUMENTS

| | | | |
|---|---|---|---|
| 2011/0222107 A1* | 9/2011 | Williams | G06F 3/1247 358/1.15 |
| 2017/0060507 A1* | 3/2017 | Salgado | G06F 9/4413 |
| 2019/0196753 A1* | 6/2019 | Minegishi | G06F 3/1239 |
| 2020/0189298 A1* | 6/2020 | Urlaub | H04N 1/00708 |
| 2021/0117135 A1* | 4/2021 | Suzuki | G06F 3/1228 |

FOREIGN PATENT DOCUMENTS

JP 2019074906 A 5/2019

* cited by examiner

*Primary Examiner* — John R Wallace
(74) *Attorney, Agent, or Firm* — Canon U.S.A., Inc. IP Division

(57) ABSTRACT

An information processing apparatus includes: a first acquisition unit configured to acquire function information of a device created by a driver corresponding to the device; a second acquisition unit configured to acquire a type of the device; an editing unit configured to edit the function information acquired by the first acquisition unit; and a control unit configured to control the editing unit such that editing processing for the function information acquired by the first acquisition unit is performed based on the type of the device acquired by the second acquisition unit.

18 Claims, 22 Drawing Sheets

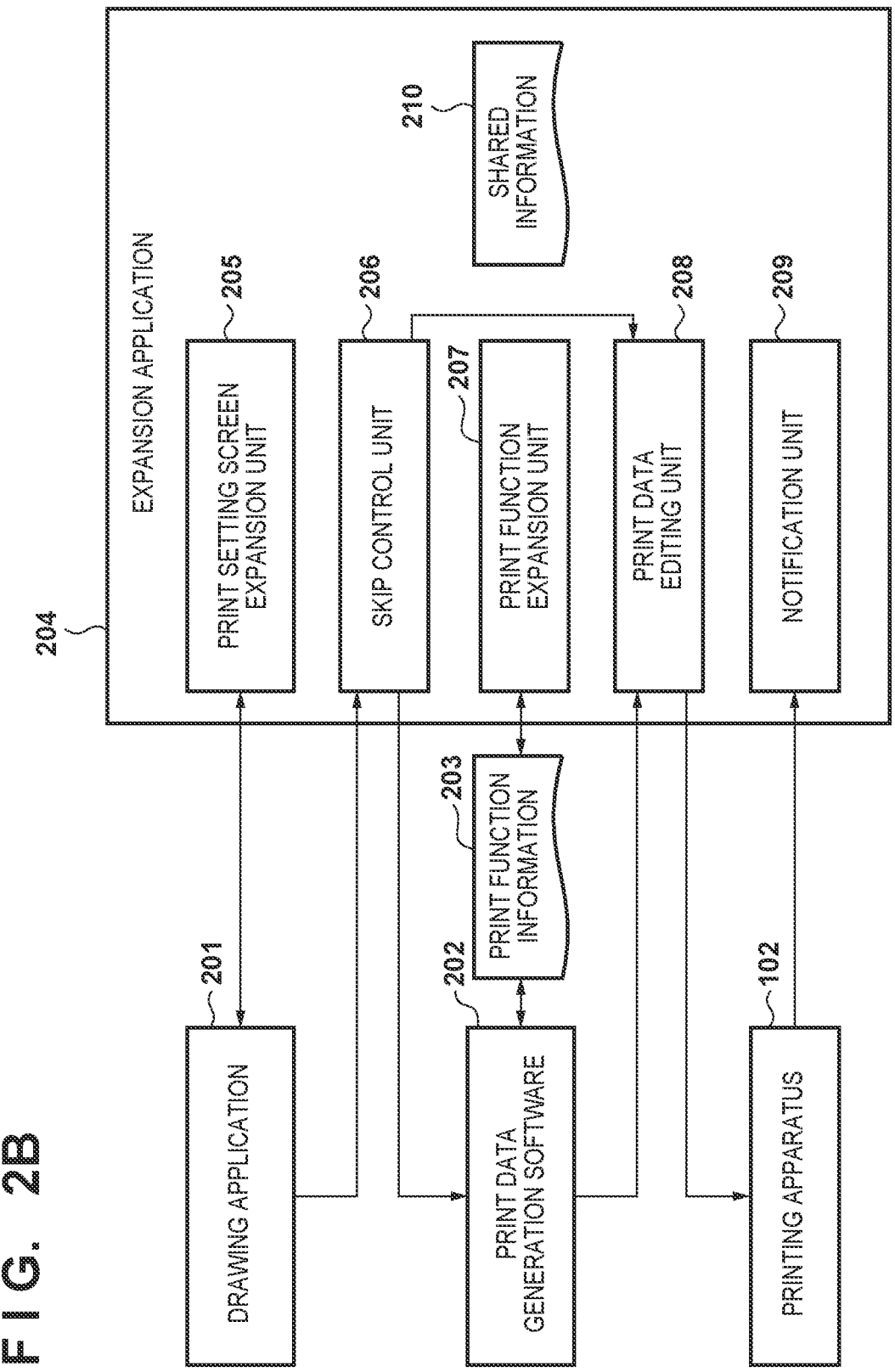

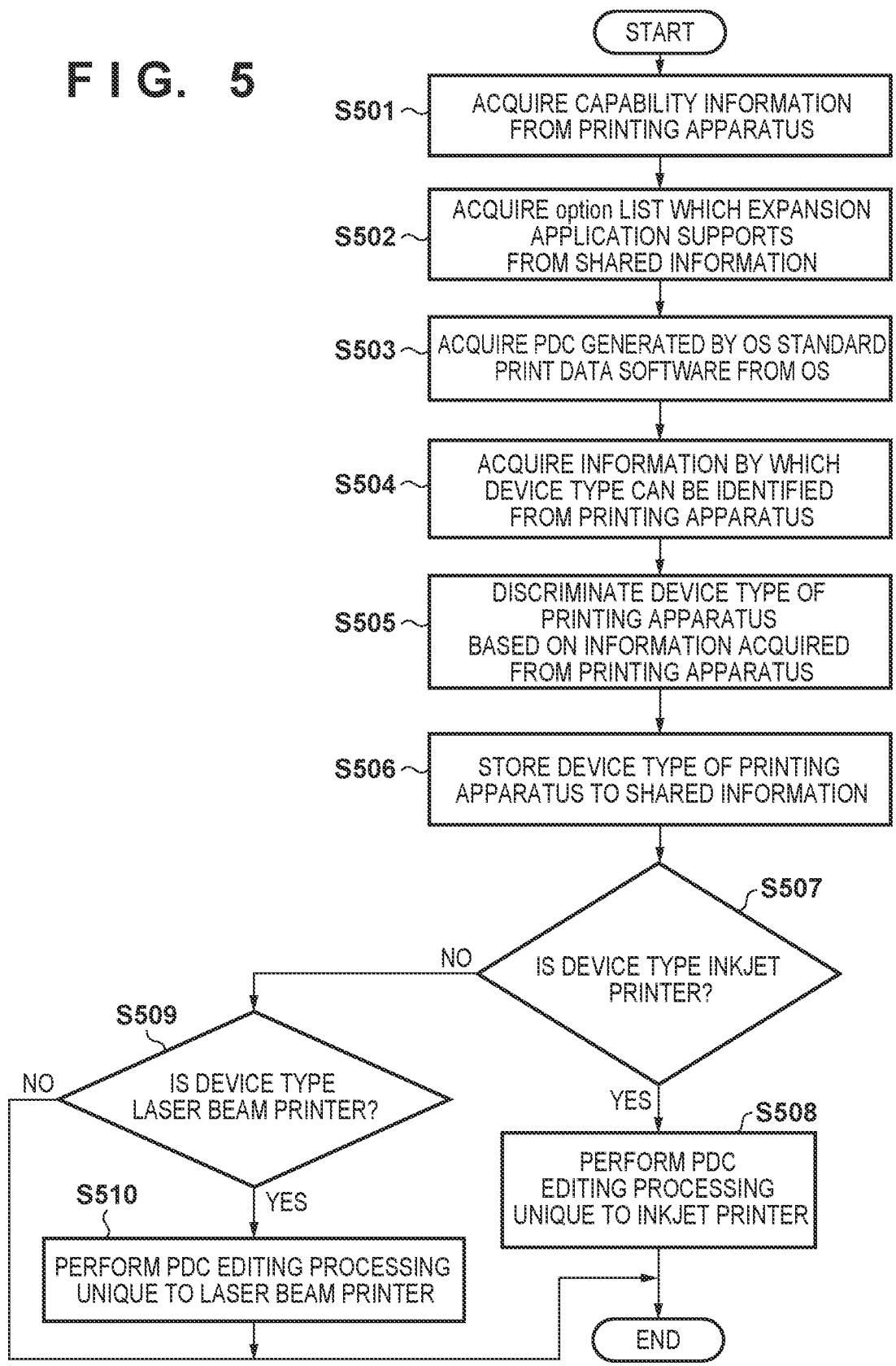

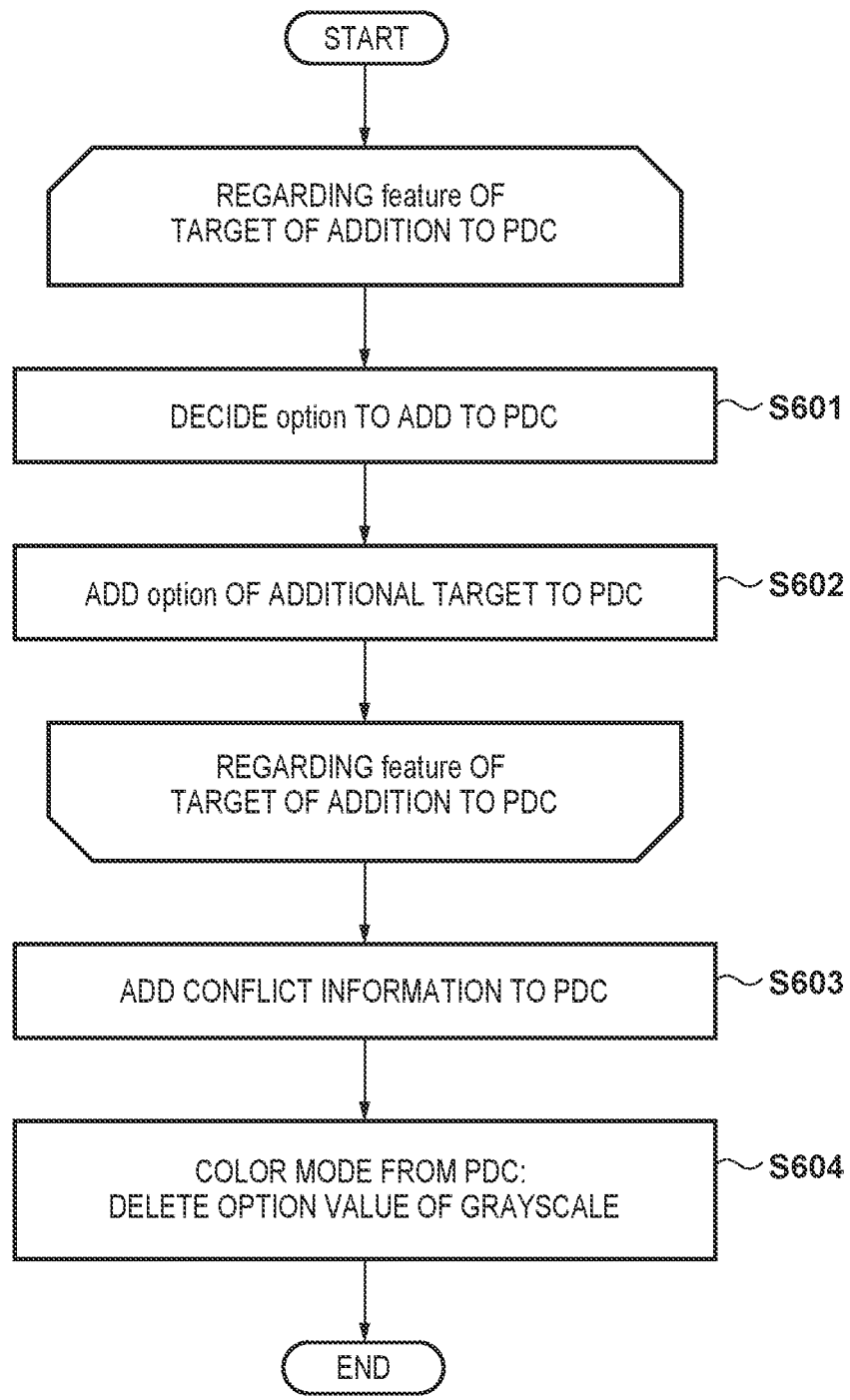

F I G. 10

```xml
<?xml version="1.0" encoding="utf-8"?>
<PrintDeviceCapabilities...>
...
    <psk:PageMediaSize psf2:psftype="Feature">
        <psk:ISOA4 psf2:psftype="Option" psf2:default="true">
            <psk:MediaSizeWidth xsi:type="xsd:integer" psf2:psftype="ScoredProperty">210000</psk:MediaSizeWidth>
            <psk:MediaSizeHeight xsi:type="xsd:integer" psf2:psftype="ScoredProperty">297000</psk:MediaSizeHeight>
            <psk12:PortraitImageableSize...>3400,5000,203200,287000</psk12:PortraitImageableSize>
        </psk:ISOA4>
        <psk:NorthAmericaLetter psf2:psftype="Option" psf2:default="false">
            <psk:MediaSizeWidth xsi:type="xsd:integer" psf2:psftype="ScoredProperty">215900</psk:MediaSizeWidth>
            <psk:MediaSizeHeight xsi:type="xsd:integer" psf2:psftype="ScoredProperty">279400</psk:MediaSizeHeight>
            <psk12:PortraitImageableSize...>6400,5000,203200,269400</psk12:PortraitImageableSize>
        </psk:NorthAmericaLetter>
        <psk:ISOA5 psf2:psftype="Option" psf2:default="false">
            <psk:MediaSizeWidth xsi:type="xsd:integer" psf2:psftype="ScoredProperty">148000</psk:MediaSizeWidth>
            <psk:MediaSizeHeight xsi:type="xsd:integer" psf2:psftype="ScoredProperty">210000</psk:MediaSizeHeight>
            <psk12:PortraitImageableSize...>3400,5000,141200,200000</psk12:PortraitImageableSize>
        </psk:ISOA5>
    </psk:PageMediaSize>

<psk:PageMediaType psf2:psftype="Feature">
        <psk:AutoSelect ... psf2:psftype="Option" psf2:default="true"/>
        <psk:Plain ... psf2:psftype="Option" psf2:default="false"/>
        <psk:Photographic ... psf2:psftype="Option" psf2:default="false"/>
        <psk:EnvelopePlain ... psf2:psftype="Option" psf2:default="false"/>
    </psk:PageMediaType>

<psk:JobInputBin psf2:psftype="Feature">
        <psk:AutoSelect psf2:psftype="Option" psf2:default="true"/>
        <ns0000:Main psf2:psftype="Option" psf2:default="false"> ... </ns0000:Main>
        <ns0000:Rear psf2:psftype="Option" psf2:default="false"> ... </ns0000:Rear>
    </psk:JobInputBin>

<psk:PageOutputColor psf2:psftype="Feature">
        <psk:Color psf2:psftype="Option" psf2:default="true"/>
        <psk:Monochrome psf2:psftype="Option" psf2:default="false"/>
        <psk:GrayScale psf2:psftype="Option" psf2:default="false">
    </psk:PageOutputColor>

<psf2:InvalidCombination>
        <psf2:InvalidCombinationEntry psf:feature="psk:PageMediaType" psf2:option="psk:Photographic"/>
        <psf2:InvalidCombinationEntry psf:feature="psk:JobInputBin" psf2:option="ns0000:Main"/>
    </psf2:InvalidCombination>

...

</PrintDeviceCapabilities>
```

F I G. 11

1101

| Feature | Option |
|---|---|
| SIZE | A4 |
| | A5 |
| | LETTER |
| MEDIUM | PLAIN PAPER |
| | PHOTO PAPER |
| | ENVELOPE |
| PAPER FEED PORT | AUTOMATIC SELECTION |
| | MAIN TRAY |
| | REAR TRAY |
| ... | ... |

| Feature | Option |
|---|---|
| SIZE | A4 |
| | A5 |
| | LETTER |
| | 7×10 INCH |
| | WESTERN STYLE NO. 6 |
| MEDIUM | PLAIN PAPER |
| | PHOTO PAPER |
| | ENVELOPE |
| | GLOSSY GOLD |
| | MATTE PHOTO PAPER |
| PAPER FEED PORT | AUTOMATIC SELECTION |
| | MAIN TRAY |
| | REAR TRAY |
| ... | ... |

| Feature | Option |
|---|---|
| SIZE | A4 |
| | A5 |
| | LETTER |
| | 7×10 INCH |
| | WESTERN STYLE NO. 6 |
| | BUSINESS CARD |
| | SQUARE |
| MEDIUM | PLAIN PAPER |
| | PHOTO PAPER |
| | ENVELOPE |
| | GLOSSY GOLD |
| | MATTE PHOTO PAPER |
| | FINE ART |
| PAPER FEED PORT | AUTOMATIC SELECTION |
| | MAIN TRAY |
| | REAR TRAY |
| ... | ... |

FIG. 14A

```
                                                                  ┌1401
<?xml version="1.0" encoding="utf-8"?>
<PrintDeviceCapabilities...>
   ...
   <psk:PageMediaSize psf2:psftype="Feature">
      <psk:ISOA4 psf2:psftype="Option" psf2:default="true">              ┌1402
         <psk:MediaSizeWidth xsi:type="xsd:integer" psf2:psftype="ScoredProperty">210000</psk:MediaSizeWidth>
         <psk:MediaSizeHeight xsi:type="xsd:integer" psf2:psftype="ScoredProperty">297000</psk:MediaSizeHeight>
         <psk12:PortraitImageableSize...>3400,5000,203200,287000</psk12:PortraitImageableSize>
      </psk:ISOA4>
      <psk:NorthAmericaLetter psf2:psftype="Option" psf2:default="false">
         <psk:MediaSizeWidth xsi:type="xsd:integer" psf2:psftype="ScoredProperty">215900</psk:MediaSizeWidth>
         <psk:MediaSizeHeight xsi:type="xsd:integer" psf2:psftype="ScoredProperty">279400</psk:MediaSizeHeight>
         <psk12:PortraitImageableSize ...>6400,5000,203200,269400</psk12:PortraitImageableSize>
      </psk:NorthAmericaLetter>
      <psk:ISOA5 psf2:psftype="Option" psf2:default="false">
         <psk:MediaSizeWidth xsi:type="xsd:integer" psf2:psftype="ScoredProperty">148000</psk:MediaSizeWidth>
         <psk:MediaSizeHeight xsi:type="xsd:integer" psf2:psftype="ScoredProperty">210000</psk:MediaSizeHeight>
         <psk12:PortraitImageableSize ...>3400,5000,141200,200000</psk12:PortraitImageableSize>
      </psk:ISOA5>
      <ns0002:oe7x10in psf2:psftype="Option" psf2:default="false">
         <psk:MediaSizeWidth psf2:psftype="ScoredProperty" xsi:type="xsd:integer">177800</psk:MediaSizeWidth>
         <psk:MediaSizeHeight psf2:psftype="ScoredProperty" xsi:type="xsd:integer">254000</psk:MediaSizeHeight>
         <psk12:PortraitImageableSize ...>3400,5000,171000,244000</psk12:PortraitImageableSize>
      </ns0002:oe7x10in>
      <ns0002:JapanYou6Envelope psf2:psftype="Option" psf2:default="false">
         <psk:MediaSizeWidth psf2:psftype="ScoredProperty" xsi:type="xsd:integer">98000</psk:MediaSizeWidth>
         <psk:MediaSizeHeight psf2:psftype="ScoredProperty" xsi:type="xsd:integer">190000</psk:MediaSizeHeight>
         <psk12:PortraitImageableSize ...>5600,8000,86800,169300</psk12:PortraitImageableSize>
      </ns0002:JapanYou6Envelope>
   </psk:PageMediaSize>
```

FIG. 14B

```xml
<psk:PageMediaType psf2:psftype="Feature">                    ~1403
    <psk:AutoSelect ... psf2:psftype="Option" psf2:default="true"/>
    <psk:Plain ... psf2:psftype="Option" psf2:default="false"/>
    <psk:Photographic ... psf2:psftype="Option" psf2:default="false"/>
    <psk:EnvelopePlain ... psf2:psftype="Option" psf2:default="false"/>
    <ns0002:PhotoPaperGlossy psf2:psftype="Option" psf2:default="false"/>
    <ns0002:MattePhotoPaper psf2:psftype="Option" psf2:default="false"/>
</psk:PageMediaType>

<psk:JobInputBin psf2:psftype="Feature">                      ~1404
    <psk:AutoSelect psf2:psftype="Option" psf2:default="true"/>
    <ns0000:Main psf2:psftype="Option" psf2:default="false"> ... </ns0000:Main>
    <ns0000:Rear psf2:psftype="Option" psf2:default="false"> ... </ns0000:Rear>
</psk:JobInputBin>

<psk:PageOutputColor psf2:psftype="Feature">
    <psk:Color psf2:psftype="Option" psf2:default="true"/>    ~1405
    <psk:Monochrome psf2:psftype="Option" psf2:default="false"/>
</psk:PageOutputColor>

<psf2:InvalidCombination>                                                  ~1406
    <psf2:InvalidCombinationEntry psf2:feature="psk:PageMediaType" psf2:option="psk:Photographic"/>
    <psf2:InvalidCombinationEntry psf2:feature="psk:JobInputBin" psf2:option="ns0000:Main"/>
</psf2:InvalidCombination>
<psf2:InvalidCombination>
    <psf2:InvalidCombinationEntry psf2:feature="psk:PageMediaType" psf2:option="ns0002:PhotoPaperGlossy"/>
    <psf2:InvalidCombinationEntry psf2:feature="psk:JobInputBin" psf2:option="ns0000:Main"/>
</psf2:InvalidCombination>
<psf2:InvalidCombination>
    <psf2:InvalidCombinationEntry psf2:feature="psk:PageMediaType" psf2:option="ns0002:PhotoPaperGlossy"/>
    <psf2:InvalidCombinationEntry psf2:feature="psk:JobInputBin" psf2:option="ns0000:Disc"/>
</psf2:InvalidCombination>
    ...

</PrintDeviceCapabilities>
```

| SIZE | PAPER FEED PORT | MEDIUM |
|---|---|---|
| A4 | AUTO | PLAIN PAPER |
| A4 | AUTO | PHOTO PAPER |
| A4 | AUTO | ENVELOPE |
| A4 | MAIN TRAY | PLAIN PAPER |
| A4 | REAR TRAY | PLAIN PAPER |
| A4 | REAR TRAY | PHOTO PAPER |
| A4 | REAR TRAY | ENVELOPE |
| A4 | REAR TRAY | GLOSSY GOLD |
| A4 | REAR TRAY | MATTE PHOTO PAPER |
| LETTER | AUTO | PLAIN PAPER |
| LETTER | AUTO | PHOTO PAPER |
| LETTER | AUTO | ENVELOPE |
| LETTER | MAIN TRAY | PLAIN PAPER |
| LETTER | REAR TRAY | PLAIN PAPER |
| LETTER | REAR TRAY | PHOTO PAPER |
| ... | ... | ... |

F I G. 16A

1601

```
<?xml version="1.0" encoding="utf-8"?>
<PrintDeviceCapabilities...>
  ...
  <psk:PageMediaSize psf2:psftype="Feature">
      <psk:ISOA4 psf2:psftype="Option" psf2:default="true">
          <psk:MediaSizeWidth xsi:type="xsd:integer" psf2:psftype="ScoredProperty">210000</psk:MediaSizeWidth>
          <psk:MediaSizeHeight xsi:type="xsd:integer" psf2:psftype="ScoredProperty">297000</psk:MediaSizeHeight>
          <psk12:PortraitImageableSize...>3400,5000,203200,287000</psk12:PortraitImageableSize>
      </psk:ISOA4>
      <psk:NorthAmericaLetter psf2:psftype="Option" psf2:default="false">
          <psk:MediaSizeWidth xsi:type="xsd:integer" psf2:psftype="ScoredProperty">215900</psk:MediaSizeWidth>
          <psk:MediaSizeHeight xsi:type="xsd:integer" psf2:psftype="ScoredProperty">279400</psk:MediaSizeHeight>
          <psk12:PortraitImageableSize...>6400,5000,203200,269400</psk12:PortraitImageableSize>
      </psk:NorthAmericaLetter>
      <psk:ISOA5 psf2:psftype="Option" psf2:default="false">
          <psk:MediaSizeWidth xsi:type="xsd:integer" psf2:psftype="ScoredProperty">148000</psk:MediaSizeWidth>
          <psk:MediaSizeHeight xsi:type="xsd:integer" psf2:psftype="ScoredProperty">210000</psk:MediaSizeHeight>
          <psk12:PortraitImageableSize...>3400,5000,141200,200000</psk12:PortraitImageableSize>
      </psk:ISOA5>
  </psk:PageMediaSize>

<psk:PageMediaType psf2:psftype="Feature">
      <psk:AutoSelect... psf2:psftype="Option" psf2:default="true"/>
  </psk:PageMediaType>
```

F I G. 16B

```
<psk:JobInputBin psf2:psftype="Feature">
    <psk:AutoSelect psf2:psftype="Option" psf2:default="false" ... />
    <ns0000:Tray1 psf2:psftype="Option" psf2:default="true" ... />
    <ns0000:Tray3 psf2:psftype="Option" psf2:default="false" .../>
    <ns0000:ByPassTray psf2:psftype="Option" psf2:default="false" ../>
    <ns0000:Tray2 psf2:psftype="Option" psf2:default="false" ../>
</psk:JobInputBin>

<psk:PageOutputColor psf2:psftype="Feature">
    <psk:Color psf2:psftype="Option" psf2:default="true"/>          ~1602
    <psk:Monochrome psf2:psftype="Option" psf2:default="false"/>
    <psk:GrayScale psf2:psftype="Option" psf2:default="false">
</psk:PageOutputColor>

<psk:JobPageOrder psf2:psftype="Feature">
    <psk:Standard psf2:psftype="Option" psf2:default="true"/> ~1603
    <psk:Reverse psf2:psftype="Option" psf2:default="false"/>
</psk:JobPageOrder>

<psf2:InvalidCombination>                                            ~1604
    <psf2:InvalidCombinationEntry psf2:feature="psk:PageMediaSize" psf2:option="psk:ISOA5"/>
    <psf2:InvalidCombinationEntry psf2:feature="psk:JobInputBin" psf2:option="ns0000:BypassTray"/>
</psf2:InvalidCombination>

...

</PrintDeviceCapabilities>
```

```
1701
<?xml version="1.0" encoding="utf-8"?>
<PrintDeviceCapabilities...>
...
    <psk:PageMediaSize psf2:psftype="Feature">
        <psk:ISOA4 psf2:psftype="Option" psf2:default="true">
            <psk:MediaSizeWidth xsi:type="xsd:integer" psf2:psftype="ScoredProperty">210000</psk:MediaSizeWidth>
            <psk:MediaSizeHeight xsi:type="xsd:integer" psf2:psftype="ScoredProperty">297000</psk:MediaSizeHeight>
            <psk12:PortraitImageableSize...>3400,5000,203200,287000</psk12:PortraitImageableSize>
        </psk:ISOA4>
        <psk:NorthAmericaLetter psf2:psftype="Option" psf2:default"false">
            <psk:MediaSizeWidth xsi:type="xsd:integer" psf2:psftype="ScoredProperty">215900</psk:MediaSizeWidth>
            <psk:MediaSizeHeight xsi:type="xsd:integer" psf2:psftype="ScoredProperty">279400</psk:MediaSizeHeight>
            <psk12:PortraitImageableSize...>6400,5000,203200,269400</psk12:PortraitImageableSize>
        </psk:NorthAmericaLetter>
        <psk:ISOA5 psf2:psftype="Option" psf2:default="false">
            <psk:MediaSizeWidth xsi:type="xsd:integer" psf2:psftype="ScoredProperty">148000</psk:MediaSizeWidth>
            <psk:MediaSizeHeight xsi:type="xsd:integer" psf2:psftype="ScoredProperty">210000</psk:MediaSizeHeight>
            <psk12:PortraitImageableSize...>3400,5000,141200,200000</psk12:PortraitImageableSize>
        </psk:ISOA5>
    </psk:PageMediaSize>
```

F I G. 17B

```
<psk:PageMediaType psf2:psftype="Feature">
    <psk:AutoSelect ... psf2:psftype="Option" psf2:default="true"/>
</psk:PageMediaType>

<psk:JobInputBin psf2:psftype="Feature">
    <psk:AutoSelect psf2:psftype="Option" psf2:default="false" ... />
    <ns0000:Tray1 psf2:psftype="Option" psf2:default="true" ... />
    <ns0000:Tray3 psf2:psftype="Option" psf2:default="false" .../>
    <ns0000:ByPassTray psf2:psftype="Option" psf2:default="false" ../>
    <ns0000:Tray2 psf2:psftype="Option" psf2:default="false" ../>
</psk:JobInputBin>

<psk:PageOutputColor psf2:psftype="Feature">
    <psk:Color psf2:psftype="Option" psf2:default="true"/>
    <psk:Monochrome psf2:psftype="Option" psf2:default="false"/>
</psk:PageOutputColor>

<psk:JobPageOrder psf2:psftype="Feature">
    <psk:Standard psf2:psftype="Option" psf2:default="true"/>
</psk:JobPageOrder>

...

</PrintDeviceCapabilities>
```

1701

INFORMATION PROCESSING APPARATUS, METHOD, AND NON-TRANSITORY COMPUTER-READABLE STORAGE MEDIUM STORING PROGRAM

BACKGROUND

Field of the Disclosure

The present disclosure relates to an information processing apparatus for expanding the function of a device driver, a method, and a non-transitory computer-readable storage medium storing a program.

Description of the Related Art

There is known a configuration that issues a print instruction to a printing apparatus connected to a host computer using a printer driver that is installed in the host computer as the control software of the printing apparatus. An Operating System (OS) that is basic software is installed in the host computer. The printer driver is configured in accordance with specifications defined by the OS, and is invoked from the OS to operate. A vender that provides a printing apparatus provides a printer driver suitable for the specifications of the OS, thereby providing a method of instructing the printing apparatus to do printing using the OS.

Recently, in Windows®, a class driver (to be also referred to as a "standard driver" hereinafter) that is commonly usable by printing apparatuses provided by a plurality of vendors is provided. The standard driver is packaged together with the OS and can easily be used by connecting an arbitrary printing apparatus to a host computer. Hence, it is not necessary to separately install a printer driver that is suitable for a printing apparatus and unique to the model, resulting high convenience. Also, the standard driver is configured to designate a print function in accordance with PrintDeviceCapabilities (to be referred to as "PDC" hereinafter) generated based on information acquired from the connected printing apparatus. This allows a user using the standard driver to designate a print function according to the capability of the connected printing apparatus using one standard driver.

A function expansion application (to be also referred to as an "expansion application" hereinafter) can be associated with the standard driver. The expansion application can be provided by a vendor that provides a printing apparatus. The expansion application edits a PDC generated by the standard driver, thereby providing a function (expanded function) that cannot be implemented only by the standard driver. Japanese Patent Laid-Open No. 2019-74906 discloses a technique of expanding a function such as a stamp function by an expansion application. In Japanese Patent Laid-Open No. 2019-74906, the expansion application edits a spool file, thereby implementing an allocation print function.

SUMMARY

Additional contrivances are required to implement function expansion of a driver according to a device type.

Embodiments of the present disclosure provide a mechanism for implementing function expansion of a driver according to a device type.

Embodiments of the present disclosure provide a non-transitory computer-readable storage medium storing a program configured to cause a computer of an information processing apparatus to function as: a first acquisition unit configured to acquire function information of a device created by a driver; a second acquisition unit configured to acquire a type of the device; an editing unit configured to edit the function information acquired by the first acquisition unit; and a control unit configured to control the editing unit such that editing processing for the function information acquired by the first acquisition unit is performed based on the type of the device acquired by the second acquisition unit.

According to embodiments of the present disclosure, it is possible to implement function expansion of a driver according to a device type.

Further features of the present disclosure will become apparent from the following description of exemplary embodiments with reference to the attached drawings.

BRIEF DESCRIPTION OF THE DRAWINGS

FIGS. 2A and 2B are views showing the software configuration of the print system;

FIG. 5 is a flowchart showing editing processing of a PDC;

FIG. 6 is a flowchart showing editing processing of a PDC;

FIG. 10 is a view showing a PDC created by print data generation software;

FIG. 11 is a view showing a list of functions and set values described in a PDC;

FIG. 12 is a view showing a list of capability information acquired from a printing apparatus;

FIG. 13 is a view showing a list of print functions supported by the expansion application;

FIGS. 14A and 14B are views showing a PDC after editing;

FIG. 15 is a view showing combination information of Option values;

FIGS. 16A and 16B are views showing a PDC acquired from an OS; and

FIGS. 17A and 17B are views showing a PDC after editing.

DESCRIPTION OF THE EMBODIMENTS

Figure 1:
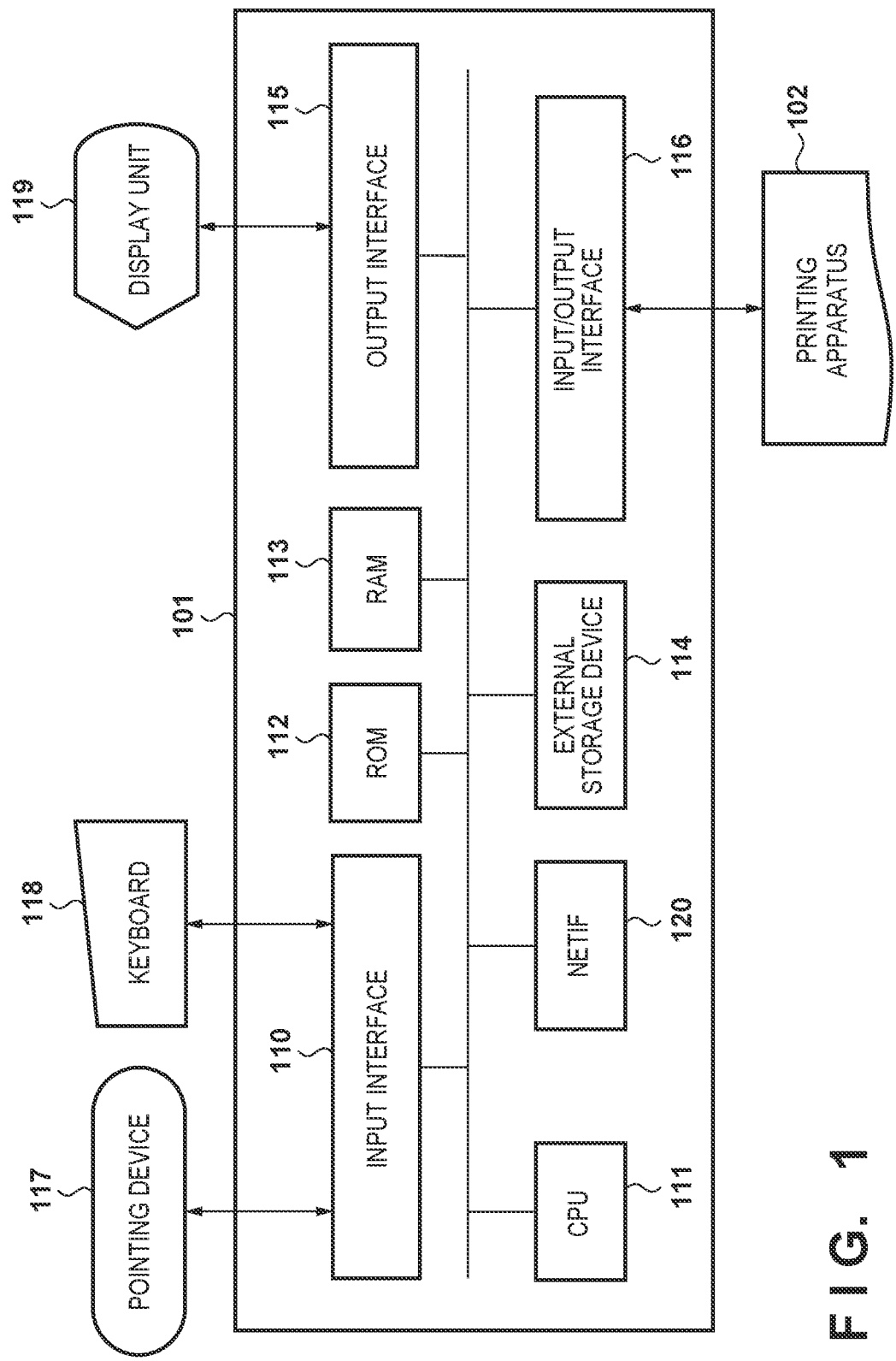
FIG. 1 is a view showing the hardware configuration of a print system.

Hereinafter, embodiments will be described in detail with reference to the attached drawings. Note, the following embodiments are not intended to limit the scope of the disclosure. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

In Japanese Patent Laid-Open No. 2019-74906, an expansion application edits a spool file, thereby implementing an allocation print function. However, additional contrivances are required to implement function expansion of a driver according to a device type.

According to embodiments of the present disclosure, it is possible to implement function expansion of a driver according to a device type.

<Hardware Configuration of Print System>

FIG. 1 is a block diagram showing an example of the hardware configuration of a print system. In FIG. 1, a host computer 101 is an example of an information processing apparatus, and includes an input interface 110, a CPU 111, a ROM 112, a RAM 113, an external storage device 114, an output interface 115, and an input/output interface 116. An input device such as a keyboard 118 or a pointing device 117 is connected to the input interface 110, and a display device such as a display unit 119 is connected to the output interface 115. A NETIF 120 is a network interface and performs control to transfer data to/from an external apparatus via a network. Note that the network can be any of a wired network, wireless network, and a network including both.

An initialization program is stored in the ROM 112. The external storage device 114 stores an application program group, an Operating System (OS), print data generation software, and various kinds of data. The RAM 113 is used as a work memory when executing various kinds of programs stored in the external storage device 114, and the various kinds of programs can operate in the host computer 101.

Note that in this embodiment, the CPU 111 performs processing in accordance with the procedure of a program stored in the ROM 112, thereby executing processing according to a function (to be described later) in the host computer 101 and a flowchart (to be described later). A printing apparatus 102 that is a device is connected to the host computer 101 via the input/output interface 116. Here, the host computer 101 and the printing apparatus 102 are separately configured. However, these may be configured as one information processing apparatus. Note that as the printing apparatus 102, an inkjet printer configured to print an image on a print medium using an inkjet printing method will be described as an example. However, it may be a printing apparatus that executes printing by another method (for example, an electrophotographic method). In addition, as the host computer 101, a desktop personal computer, a smartphone, or a laptop may be used.

<Configuration of Print System Focusing on Software>

Figure 2A:
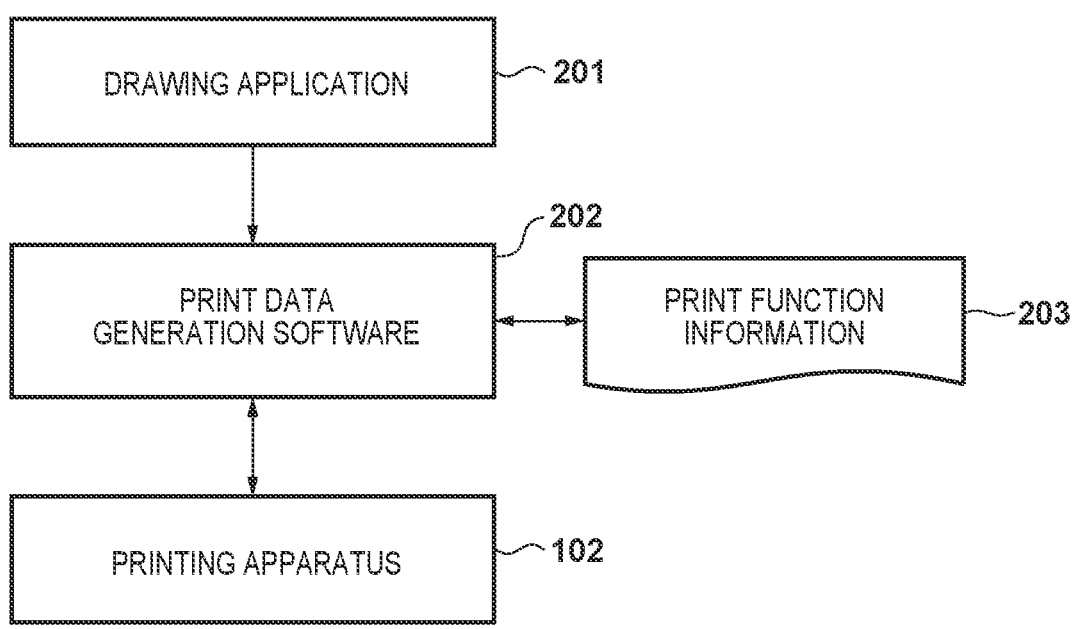

FIGS. 2A and 2B are views showing an example of the software configuration of the print system. A print system using the host computer 101 in which Windows®11 of Microsoft® is installed as an OS will described here. FIG. 2A shows a configuration in a case where an expansion application 204 is not associated with print data generation software 202 and the printing apparatus 102.

A drawing application 201 is software that creates a content (drawing data) to be printed. For example, this corresponds to a document creation application or a spreadsheet application. Upon receiving a print request, the drawing application 201 issues a print instruction to the OS. The print instruction includes print setting information used to instruct the operations of the print data generation software 202 and the printing apparatus 102. The print setting information will also be referred to as a Print Ticket (PT).

To output the print setting information, the drawing application 201 can display a print setting screen provided by one of the print data generation software 202, the OS, and the drawing application 201. The print setting screen includes a setting item (to be also referred to as a "control item" hereinafter) representing a print function settable in accordance with capability information (information settable as a print setting) acquired from the print data generation software 202, and a control item indicating its set value. The capability information will also be referred to as Print Capabilities (PC). The print data generation software 202 decides print capabilities based on print function information 203. The print function information 203 is data representing print functions, in which all settable print functions and set values thereof and the exclusive relationship between the set values are described. The print function information 203 will also be referred to as Print Device Capabilities (PDC).

The PDC 203 is included in the configuration file of the print data generation software 202 and stores as an unchangeable file in the external storage device 114. Alternatively, the PDC 203 may be generated dynamically by the print data generation software 202. More specifically, the print data generation software 202 or the OS acquires, from the printing apparatus 102, attribute data of the printing apparatus and generates the PDC 203 in accordance with the attribute information in the acquired attribute data. Note that if the PDC 203 is dynamically generated, the generated PDC 203 can be edited. Note that the attribute data of the printing apparatus, which is acquired from the printing apparatus 102, is a response acquired by issuing a Get-Printer-Attributes operation of the Internet Print Protocol (IPP) to the printing apparatus 102. The response includes attribute information representing the functions that can be designated in the printing apparatus 102 (the capabilities of the printing apparatus) and set values associated with the attribute information. This response is stored in the RAM 113.

With this configuration, the print data generation software 202 can be configured such that a user can designate a print function usable in each printing apparatus 102 in accordance with the connected printing apparatus 102. That is, even if a printing apparatus having a different function or a printing apparatus developed by a different vendor is connected, the print data generation software 202 can be configured such that the user can designate a usable print function in accordance with the connected printing apparatus.

Note that a configuration using IPP Class Driver included in Windows®11 as the print data generation software 202 will be described here. The IPP Class Driver is a printer driver that executes print processing in accordance with the specifications of a predetermined standard print protocol called Internet Print Protocol (IPP) and is packaged together with the OS. The IPP Class Driver is not a unique printer driver according to the model of the printing apparatus 102 but a standard class driver commonly usable by a plurality of printing apparatuses. The IPP Class Driver acquires the capability information of the connected printing apparatus 102 and generates the PDC 203 based on the information such that the user can designate a print function supported by the connected printing apparatus 102.

Based on the print instruction output from the drawing application 201, the OS generates intermediate data (also called input data) and transfers it to the print data generation software 202. Note that the data output by the drawing application 201 for printing is data in the Graphic Device Interface format (data in the GDI format) or data in the XML Paper Specification format (data in the XPS format). Assume that the IPP Class Driver is used as the print data generation software 202. In this case, if the data output from the drawing application 201 is data in the GDI format, the OS converts the data in the GDI format output from the drawing application 201 into data in the XPS format. Then, the OS transfers the converted data in the XPS format as intermediate data to the print data generation software 202. If the data output from the drawing application 201 is data in the XPS format, the OS transfers the data in the XPS format as intermediate data to the print data generation software 202. Note that the intermediate data includes drawing data that is the information of an image to be formed on a print medium and print setting information set by the user.

The print data generation software 202 converts the acquired intermediate data into print data that the printing apparatus 102 can interpret, and transmits the print data to the printing apparatus 102. Note that the print data includes print setting attribute information (attribute information that designates print settings) generated based on the drawing data that is the information of the image to be formed on a print medium and the print setting information set by the user. The print setting attribute information includes attribute information representing functions that can be designated in the printing apparatus 102 (the capabilities of the printing apparatus) and set values associated with the attribute information.

The printing apparatus 102 performs printing on a print medium based on the print data sent from the print data generation software 202. At this time, the printing apparatus 102 forms the drawing data included in the print data on the print medium by an operation according to the print setting attribute information included in the print data. The print setting attribute information includes attribute information for designating print quality (image quality priority, speed priority, or the like), double-sided printing, and the like and set values thereof. For example, if the print setting attribute information includes attribute information that designates double-sided printing and a set value indicating operating this, the printing apparatus 102 executes double-sided printing.

FIG. 2B is a view showing an example of a configuration in a case where the expansion application 204 is associated with the print data generation software 202 and the printing apparatus 102. Note that components and processes which are not particularly mentioned below are equivalent to those in FIG. 2A.

The expansion application 204 is software configured to expand the function of the print data generation software 202, and is software that is not included (packaged) in the OS in advance. For this reason, the user needs to operate the host computer 101 and thus download the expansion application 204 from a server via, for example, the Internet and install it. Alternatively, the expansion application 204 may automatically be installed based on connection of the printing apparatus 102 to the host computer 101. More specifically, if the printing apparatus 102 is connected to the host computer 101, the OS acquires device identification information from the printing apparatus 102. The OS may download the expansion application 204 corresponding to the acquired device identification information from a server via the Internet and install it. That is, the print data generation software 202 and the expansion application 204 are held as separate files in the host computer 101.

Note that the print data generation software 202 and the expansion application 204 are sometimes updated and upgraded, but the updating processes may be performed at different timings. That is, the timing of acquiring the print data generation software 202 by the host computer 101 and the timing of acquiring the expansion application 204 are different. In addition, the trigger to acquire the print data generation software 202 by the host computer 101 and the trigger to acquire the expansion application 204 may also be different. Note that if the expansion application 204 is installed, the OS associates the expansion application 204 with the print data generation software 202 and the printing apparatus 102.

The expansion application 204 to be described in this embodiment includes a print setting screen expansion unit 205, a skip control unit 206, a print function expansion unit 207, a print data editing unit 208, and a notification unit 209. Also, the expansion application 204 includes shared information 210 that can commonly be accessed from the units. The substance of the shared information 210 is a file stored in the external storage device 114 or information stored on the RAM 113. Using an Application Program Interface (API) provided by the OS, the expansion application 204 performs information write or read to or from the shared information 210.

Note that the expansion application 204 may end the operation every time processing of each unit ends. In this case, every time a request to use each unit is received, the OS activates the expansion application 204. Another form may be configured. For example, when the processing of the print setting screen expansion unit 205 ends, the OS ends the operation of the expansion application 204. On the other hand, even if the processing of the skip control unit 206 ends, the OS may keep the expansion application 204 activated. Furthermore, the expansion application 204 may cancel processing in the processing of each unit. If canceled, a job under processing on a print queue is deleted by the OS.

Upon receiving a print request from the user, the drawing application 201 issues a print instruction to the OS. In FIG. 2B as well, the drawing application 201 can display a print setting screen, like the configuration shown in FIG. 2A. In FIG. 2B, a print setting screen provided by the expansion application 204 is displayed. More specifically, a print setting screen provided by the print setting screen expansion unit 205 included in the expansion application 204 is displayed. Note that whether the print setting screen provided by the print setting screen expansion unit 205 is displayed depends on the operation of the user. Details of the print setting screen expansion unit 205 will be described later with reference to FIG. 4.

Also, if the drawing application 201 accepts the print request from the user, and a print instruction is issued to the OS, the OS activates the skip control unit 206. The skip control unit 206 performs control concerning whether to skip the processing of the print data generation software 202. After the skip control processing of the skip control unit 206, the OS generates intermediate data based on the print instruction output from the drawing application 201, and transfers the intermediate data to the print data generation software 202. Here, if skip control is not performed by the skip control unit 206, the intermediate data is processed by the print data generation software 202 into print data that the printing apparatus 102 can interpret, and transferred to the print data editing unit 208. On the other hand, if the print data generation software 202 is skipped, the intermediate data is transferred to the print data editing unit 208 without being processed by the print data generation software 202. Thus, the intermediate data can be processed by the print data editing unit 208.

The print data editing unit 208 performs editing of the intermediate data transferred from the print data generation software 202 or the print data processed by the print data generation software 202. As the editing contents, for example, in a case of allocation printing, the print data editing unit 208 changes the layout of the intermediate data or the print data based on the print setting screen of allocation printing received from the OS. Also, the print data editing unit 208 can display a Graphical User Interface (GUI) screen on the display unit 119, and can provide a function of displaying the layout result of the intermediate data or the print data as a preview screen. Note that in a state in which the GUI screen displayed on the display unit 119 by the print data editing unit 208 remains open, the print data is not transmitted to the printing apparatus 102. When the GUI screen is closed, print data transmission processing is performed.

After the print data editing unit 208 edits the print data, the print data is transferred to the printing apparatus 102. The printing apparatus 102 performs printing on a print medium based on the received print data. Note that if the print data generation software 202 is skipped by the skip control unit 206, the print data editing unit 208 may convert the received intermediate data into print data that the printing apparatus 102 can interpret. To convert the intermediate data into print data, a function provided by the OS may be used.

The expansion application 204 includes the print function expansion unit 207. The print function expansion unit 207 can edit the PDC 203 generated by the print data generation software 202 or the OS. The print function expansion unit 207 can thus add a function provided by the expansion application 204. In addition, the print function expansion unit 207 can add a function supported by the printing apparatus 102 but not by the print data generation software 202 and add an exclusive relationship between the set values of print functions. The OS activates the print function expansion unit 207 when the expansion application 204 is associated with the printing apparatus 102 and the print data generation software 202 for the first time. Also, the OS may activate the print function expansion unit 207 at another timing such as the activation timing of the OS. This allows the print function expansion unit 207 to detect an expanded function and add it to the PDC 203 in a case where an optional device (for example, a finisher) is added later to the printing apparatus 102, and the function associated with printing is expanded.

In addition, the expansion application 204 includes the notification unit 209. The notification unit 209 can display a notification to the user in response to the occurrence of an error in the printing apparatus 102. For example, if an out of paper error occurs in the printing apparatus 102, the print data generation software 202 detects it, and the OS displays a message on the display unit 119 using a notification function called a toast notification that is a function of the OS. When the user presses the toast notification, the notification unit 209 of the expansion application 204 is invoked by the OS, and the UI screen of the notification unit 209 is displayed. On the UI screen of the notification unit 209, for example, a detailed message of the out of paper error or a paper filling method can be displayed. Note that once the print data is transmitted to the printing apparatus 102, the expansion application 204 cannot perform screen display of, for example, a guide linked with the print data halfway through the processing of each unit.

Also, the configuration of the expansion application 204 for implementing this embodiment is not limited to a configuration including all the above-described functions (units), and may have only some of the functions or may have other functions. The expansion application 204 will sometimes simply be referred to as print software. As described above, it can be said that the expansion application 204 has at least one of the plurality of functions to be described below:

a function of displaying a setting screen (executed by the print setting screen expansion unit 205)

a function of controlling whether to skip the processing of the print data generation software 202 (executed by the skip control unit 206)

a function of editing print data to be input to the printing apparatus 102 (executed by the print data editing unit 208)

a function of expanding a function that can be designated by the print data generation software 202 (executed by the print function expansion unit 207)

a function of displaying a screen in response to the occurrence of an error in the printing apparatus 102 (executed by the notification unit 209).

<Example of Screen Displayed by Print Setting Screen Expansion Unit>

Figure 4A:
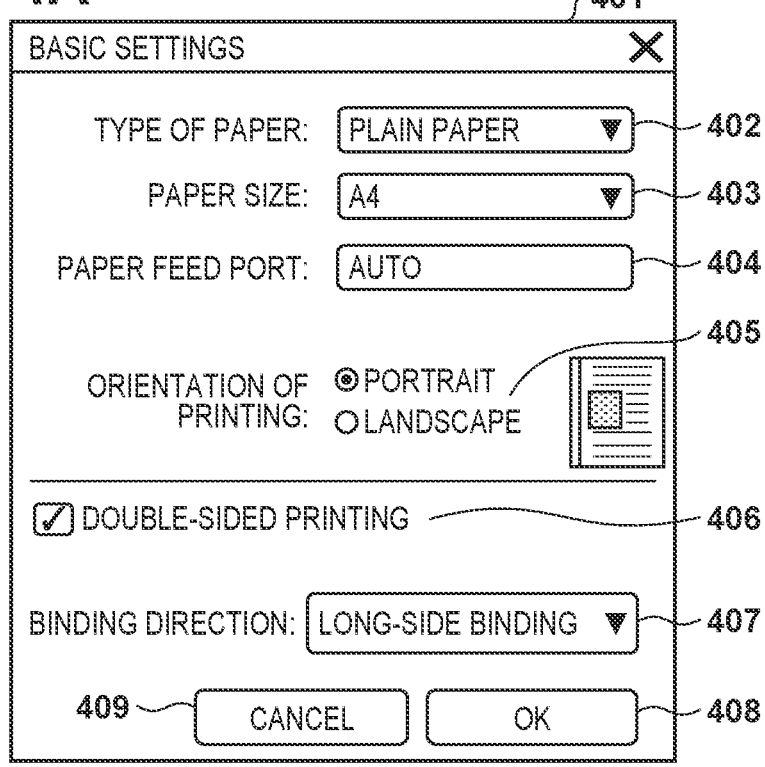
FIGS. 4A to 4C are views showing a print setting screen displayed by a print setting screen expansion unit.
Figure 4B:
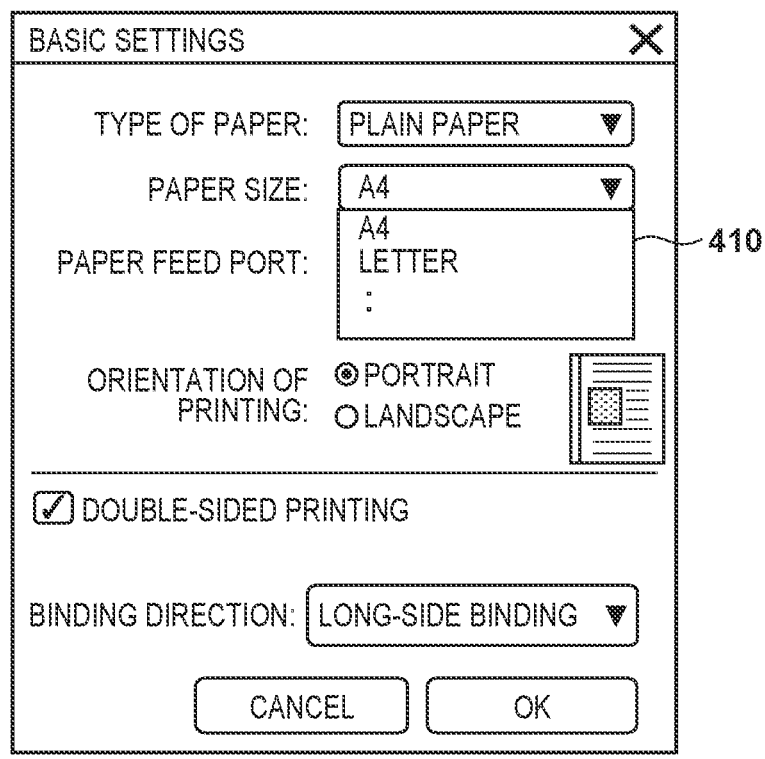
Figure 4C:
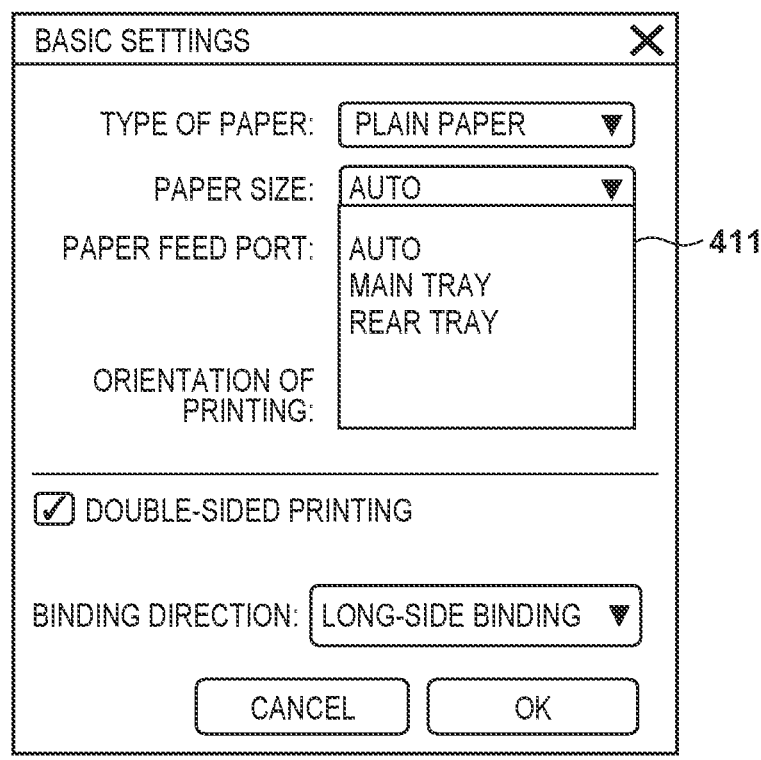

A print setting screen displayed by the print setting screen expansion unit 205 will be described with reference to FIG. 4. Print capabilities are generated based on the PDC 203 edited by the print function expansion unit 207. A print setting screen 401 shown in FIG. 4A is an example of a screen displayed based on the generated print capabilities by the print setting screen expansion unit 205. The print setting screen expansion unit 205 is invoked from the OS when the user instructs, on the drawing application 201, to display the print setting screen. Based on the print capabilities that can be acquired from the OS, the print setting screen expansion unit 205 displays a screen that allows the user to designate the set values of print functions that can be designated by the print data generation software 202.

A control 402 is a control item capable of setting a type of paper to be used in printing and, for example, an item such as plain paper and photo paper can be set. A control 403 is a control item capable of setting a paper size to be used in printing and, for example, an item such as A4 or letter can be set. A list 410 shown in FIG. 4B indicates a display state when the control 403 is expanded, and the user can select a paper size from the expanded list.

A control 404 is a control item capable of setting a paper feed port of print paper in the printing apparatus 102 and, for example, an item such as main tray or rear tray can be set. A list 411 shown in FIG. 4C indicates a display state when the control 404 is expanded, and the user can select a paper feed port from the expanded list.

A control 405 is a control item capable of setting an orientation of printing, and portrait or landscape can be set. A control 406 is a control item capable of switching an enable/disable state of double-sided printing. A control 407 is a control item capable of setting a binding direction in double-sided printing and, for example, an item such as long-side binding and short-side binding can be set. A control 409 is a cancel button, and the screen can be closed without reflecting the settings. A control 408 is an OK button, and the screen is closed after reflecting the settings.

<Editing Processing of PDC by Print Function Expansion Unit>

Figure 3:
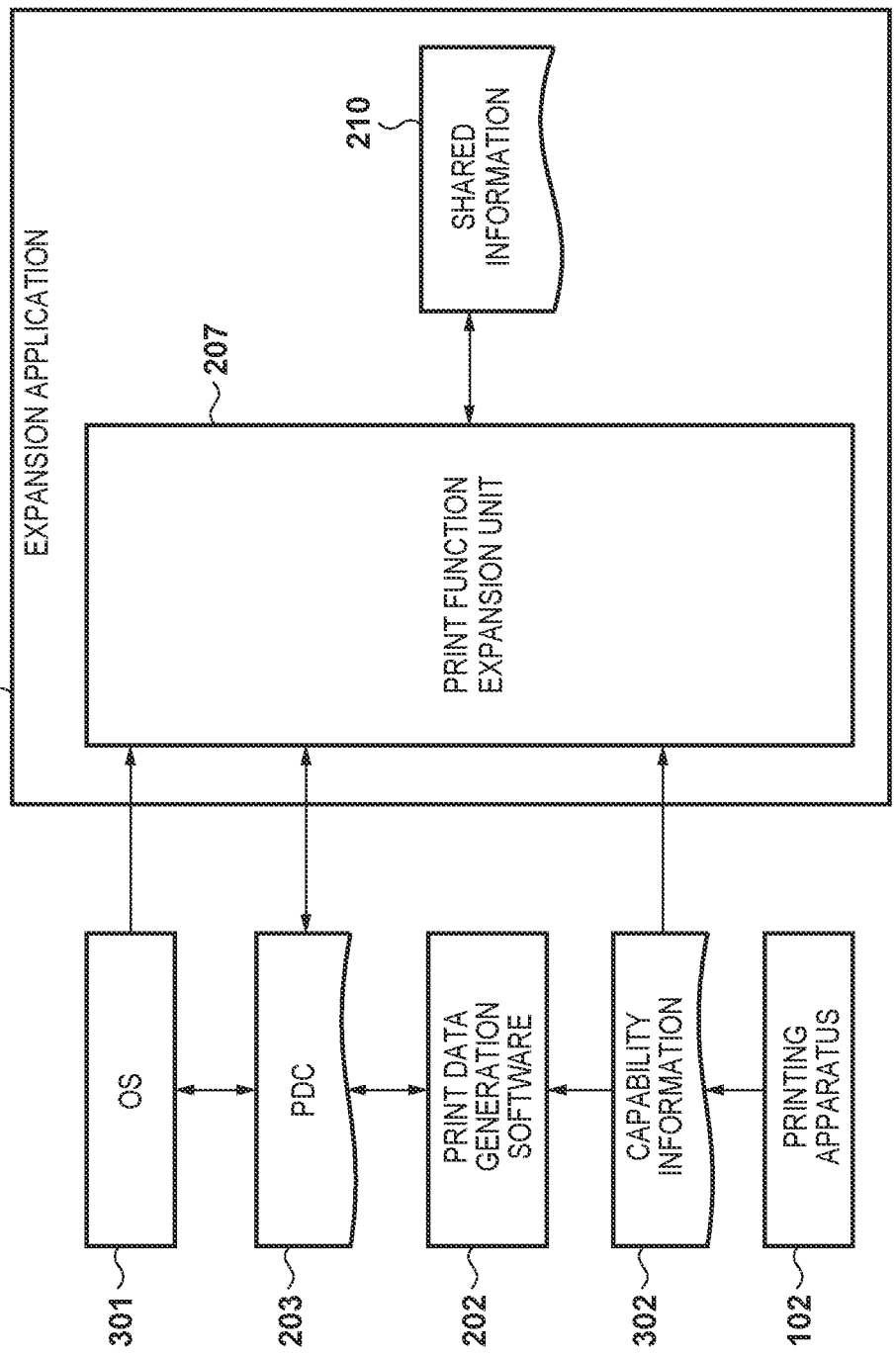
FIG. 3 is a view for explaining editing processing of a PDC.

FIG. 3 is a block diagram for explaining editing processing of the PDC 203 by the print function expansion unit 207 in the print system. First, the print data generation software 202 acquires capability information 302 of the printing apparatus 102 connected to the host computer 101 and generates the PDC 203 based on the information. The capability information 302 acquired from the printing apparatus 102 is information including information that the user can set as print settings at the time of printing in the printing apparatus 102. An OS 301 requests the print function expansion unit 207 in the expansion application 204 to edit the PDC 203 at the timing of associating the expansion application 204 with a print queue concerning the printing apparatus 102. The OS 301 may issue the request to edit the PDC 203 not only at the timing of associating the expansion application 204 for the first time but also at a timing when the print setting screen is opened by the print setting screen expansion unit 205. Upon accepting the PDC editing request from the OS 301, the print function expansion unit 207 acquires the PDC 203 generated by the print data generation software 202 and starts editing the PDC 203. Details of print function expansion by the editing of the PDC 203 will be described below.

FIG. 5 is a flowchart showing editing processing of the PDC 203 by the print function expansion unit 207 in the print system. The processing shown in FIG. 5 is implemented by, for example, the CPU 111 reading out a program stored in the ROM 112 to the RAM 113 and executing the program. The following description will be made by defining the print function expansion unit 207 as the main constituent of each process. In fact, a corresponding function is implemented by the CPU 111 executing a corresponding program.

The processing shown in FIG. 5 starts when the expansion application 204 receives an editing instruction of the PDC 203 from the OS 301. In step S501, the print function expansion unit 207 acquires capability information from the printing apparatus 102. The capability information 302 includes attribute information representing a function (Feature) that can be designated in the printing apparatus 102, and a set value (Option) associated with the attribute information. The capability information 302 is included in a response acquired by issuing a Get-Printer-Attributes operation of the IPP to the printing apparatus 102.

FIG. 12 is a view showing an example of the list of the capability information 302 acquired from the printing apparatus 102. As shown in a table 1201, information of functions (Features) such as a size and a medium and set values (Options) settable for the functions can be acquired from the printing apparatus 102. In this embodiment, a paper size, a medium, and a paper feed port will be described as the print functions. Other Features or Options such as copy printing may be used. Note that Feature names and Option names used in the following description are merely examples, and other names (information representing functions) or set values may be used.

In step S502, the print function expansion unit 207 acquires, from the shared information 210, a list of print functions supported by the expansion application 204. The list of print functions supported by the expansion application 204 is stored in the shared information 210, and all print functions processible by the expansion application 204 and set values thereof are described.

FIG. 13 is a view showing an example of a list of print functions supported by the expansion application 204. The list of print functions supported by the expansion application 204 includes functions settable at the time of printing, such as a size and a medium, and set values settable for the functions. The list of print functions supported by the expansion application 204 is sometimes updated by, for example, updating the expansion application 204.

In step S503, the print function expansion unit 207 acquires, from the OS 301, the PDC 203 created by the print data generation software 202. The PDC 203 is created by the capability information 302 that the print data generation software 202 acquires from the printing apparatus 102.

FIG. 10 is a view showing an example of the PDC 203 created by the print data generation software 202. A PDC 1001 includes the information of functions supported by the print data generation software 202, which are decided based on the information of the functions (Features) supported by the printing apparatus 102 and the information of set values (Options) for the functions.

For example, information 1002 shows that ISOA4 or NorthAmericaLetter (letter) can be designated as PageMediaSize (paper size). Here, PageMediaSize represents a function (Feature), and ISOA4 and the like represent set values (Options) for the function. Even for functions to be described later, functions (Features) and set values (Options) are described using a similar notation. Information 1003 shows that Plain (plain paper) or Photographic (photo paper) can be designated as PageMediaType (medium). Also, information 1004 shows that Main (main tray) or Rear (rear tray) can be designated as JobInputBin (paper feed port). Information 1005 shows that color, monochrome, or grayscale can be designated as PageOutputColor (mode in printing). Information 1006 is inhibition information (conflict information) for causing the OS 301 to control to inhibit printing that two items described are simultaneously designated. In the example of the PDC 1001, printing for which Photographic (photo paper) is designated as the medium, and Main (main tray) is designated as the paper feed port is inhibited by the OS 301. The pieces of information described in the PDC 1001 are merely examples, and other Features, Options, and conflict information may be described.

FIG. 11 is a view showing an example of a list of print functions and set values settable for the functions described in the PDC 203 created by the print data generation software 202. Of the capability information 302 (table 1201) acquired from the printing apparatus 102, only the print functions supported by the print data generation software 202 are described in the PDC 1001 created by the print data generation software 202. For this reason, the functions of the PDC 1001 are limited. For example, although the capability information 302 (table 1201) acquired from the printing apparatus 102 includes 7×10 inches and western style No. 6 as sizes, the sizes are not supported in the print functions (table 1101) supported by the print data generation software 202, and the sizes are not described in the PDC 1001. In this embodiment, the print function expansion unit 207 adds a Feature or an Option to the PDC 1001, and the expansion application 204 can thus compensate for the function shortage of the print data generation software 202.

In this embodiment, the print function expansion unit 207 can delete an unnecessary Feature or Option from the PDC 1001 created by the print data generation software 202. For example, in the PDC 1001 created by the print data generation software 202, three Options, that is, Color, Monochrome, and Grayscale are described concerning the Feature "PageOutputColor". Here, Grayscale is not information returned from the printing apparatus 102 but is created uniquely by the print data generation software 202. The printing apparatus 102 according to this embodiment is configured to perform the same operation regardless of whether Monochrome or Grayscale is designated by PageOutputColor. Hence, designating only one of Monochrome and Grayscale of PageOutputColor suffices. In such a case, the print function expansion unit 207 can execute processing of deleting an unnecessary Option item.

Also, there exist a plurality of combinations of Option values inhibited in the printing apparatus 102. However, the pieces of conflict information described in the PDC 1001 of the printing apparatus 102 generated by the print data generation software 202 are limited. If a combination of Option values that should be inhibited from being set is designated, and printing is performed by the printing apparatus 102, the printing apparatus 102 may perform unexpected operation. Hence, in the PDC 1001 of the printing apparatus 102, a combination of Option values that should be inhibited from being set is preferably described as the conflict information.

Return to the description of the processing shown in FIG. 5 by the print function expansion unit 207. In step S504, the print function expansion unit 207 acquires, from the printing apparatus 102, information for discriminating the device type of the printing apparatus 102. In step S505, the print function expansion unit 207 discriminates the device type based on the acquired information. The print function expansion unit 207 can add or delete Features or Options to or from the PDC 1001. At this time, the Features or Options that the print function expansion unit 207 should add or delete to or from the PDC 1001 change depending on the type of the printing apparatus 102. Details of PDC editing according to the device type will be described later. In this embodiment, three types including an inkjet printer of local connection, an inkjet printer of cloud connection, and a laser beam printer (local connection and cloud connection) will be described as the examples of the types of the printing apparatus 102.

Note that local connection indicates a form in which the host computer 101 and the printing apparatus 102 are connected via the input/output interface 116 or the NETIF 120 such that these can directly communicate. Cloud connection indicates a connection form in which a print instruction is sent from the host computer 101 to the printing apparatus 102 via the NETIF 120 and via a cloud print service (not shown) on the Internet. Note that all the detailed examples of Features and Options such as the PDC 1001 and the capability information 302 (table 1201) described above are examples associated with a printing apparatus whose device type is inkjet printer. Charts and the like to be exemplified below, in which detailed examples of Features and Options are described, are associated with a printing apparatus whose device type is inkjet printer unless it is specifically stated otherwise. In this embodiment, the above-described three device types are shown as an example. However, the device types are not limited to the three types, and a plurality of other device types or connection forms may be discriminated.

Figure 9:
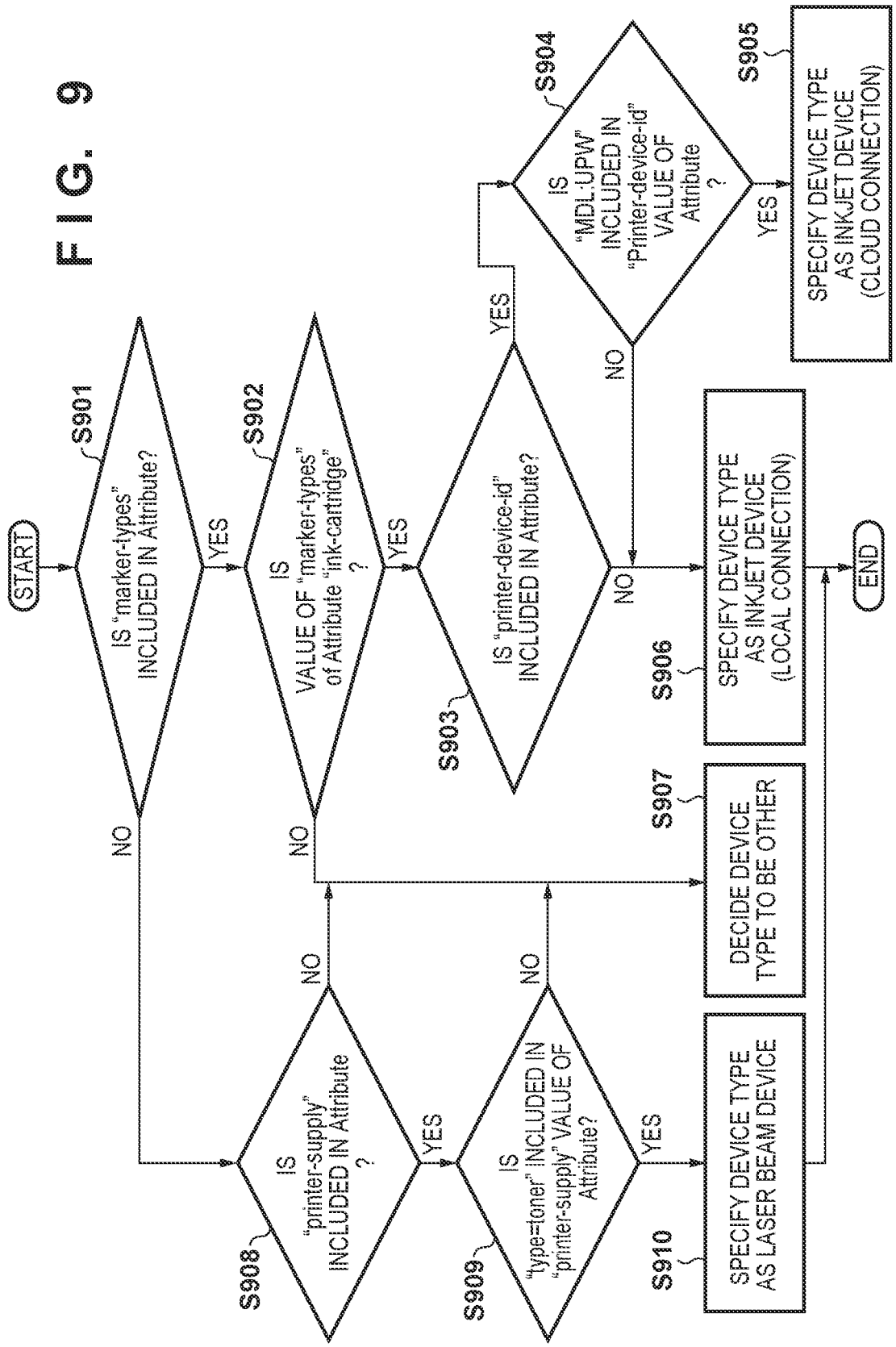
FIG. 9 is a flowchart showing editing processing of a PDC.

FIG. 9 is a flowchart showing processing of step S505 by the print function expansion unit 207. Note that the processing shown in FIG. 9 is done on the assumption that the information acquired in step S505 is information obtained by a response to the Get-Printer-Attribute operation of the IPP of the printing apparatus 102. However, the device type may be judged using information obtained by another method.

In step S901, the print function expansion unit 207 determines whether a marker-types attribute is included in the response of the Get-Printer-Attribute operation of the IPP of the printing apparatus 102. If it is determined that the marker-types attribute is included, the process advances to step S902. In step S902, the print function expansion unit 207 determines whether the marker-types attribute value in the response of the Get-Printer-Attribute operation of the IPP of the printing apparatus 102 is ink-cartridge. If it is determined that the marker-types attribute value is ink-cartridge, the process advances to step S903. In step S903, the print function expansion unit 207 determines whether a printer-device-id attribute is included in the response of the Get-Printer-Attribute operation of the IPP of the printing apparatus 102.

If it is determined that the printer-device-id attribute is included, the process advances to step S904. In step S904, the print function expansion unit 207 determines whether the printer-device-id attribute value in the response of the Get-Printer-Attribute operation of the IPP of the printing apparatus 102 includes MDL: UPW. Upon determining that MDL: UPW is included, in step S905, the print function expansion unit 207 specifies the device type of the printing apparatus 102 as "inkjet printer of cloud connection". Note that the printing apparatus 102 according to this embodiment returns MDL: UPW to the printer-device-id attribute value of the response of the Get-Printer-Attribute operation of the IPP in a case of cloud connection. However, another attribute value or return value may be used. In step S904, the print function expansion unit 207 may determine, based on the specifications of the printing apparatus 102, whether the printing apparatus uses cloud connection. The print function expansion unit 207 may determine, using a method other than the above-described method, whether the printing apparatus 102 uses cloud connection. For example, if the printing apparatus 102 uses cloud connection, the print data generation software 202 for cloud connection is used. Hence, it may be determined whether the printing apparatus 102 uses cloud connection by determining the name or type of the print data generation software 202 in step S904.

If it is determined in step S903 that the printer-device-id attribute is not included, or if it is determined in step S904 that MDL: UPW is not included, the process advances to step S906. In step S906, the print function expansion unit 207 specifies the device type of the printing apparatus 102 as "inkjet printer of local connection".

If it is determined in step S901 that the marker-types attribute is not included, the process advances to step S908. In step S908, the print function expansion unit 207 determines whether a printer-supply attribute is included in the response of the Get-Printer-Attribute operation of the IPP of the printing apparatus 102. If it is determined in step S908 that the printer-supply attribute is included, the process advances to step S909. In step S909, the print function expansion unit 207 determines whether type=toner is included in the printer-supply attribute value of the response of the Get-Printer-Attribute operation of the IPP of the printing apparatus 102. Upon determining in step S909 that type=toner is included, in step S910, the print function expansion unit 207 specifies the device type of the printing apparatus 102 as "laser beam printer".

If it is determined in step S902 that the marker-types attribute value is not ink-cartridge, or if it is determined in step S908 that the printer-supply attribute is not included, or if it is determined in step S909 that type=toner is not included, the process advances to step S907. In step S907, the print function expansion unit 207 specifies the device type of the printing apparatus 102 as "others".

In FIG. 9, the print function expansion unit 207 specifies the device type based on the information obtained by the response of the Get-Printer-Attribute operation of the IPP of the printing apparatus 102. However, the device type may be specified based on other information. For example, the device type may be specified based on information acquired from the printing apparatus 102 by another method. Alternatively, the device type may be specified based on information acquired from the printing apparatus 102, such as the name of the printing apparatus 102, and table information held by the expansion application 204. At this time, the table information may be acquired from a server (not shown).

Return to the description of the processing shown in FIG. 5. In step S506, the print function expansion unit 207 stores, in the shared information 210, the device type information of the printing apparatus 102 specified in step S505. The stored device type information of the printing apparatus 102 is used by the print function expansion unit 207 to switch the contents of editing processing of the PDC 203. However, the device type information may be used by another unit in the expansion application 204 for another application purpose. If the device type information of the printing apparatus 102 is already included in the shared information 210, the print function expansion unit 207 may skip the processes of steps S504 and S505.

In step S507, the print function expansion unit 207 determines whether the device type information of the printing apparatus 102 stored in the shared information 210 indicates inkjet printer. Upon determining in step S507 that the device type is inkjet printer, in step S508, the print function expansion unit 207 performs editing processing of the PDC 203 corresponding to a case where the device type is inkjet printer. Details of the process of step S508 will be described later with reference to FIG. 6.

Upon determining in step S507 that the device type is not inkjet printer, in step S509, the print function expansion unit 207 determines whether the device type information of the printing apparatus 102 stored in the shared information 210 is laser beam printer. Upon determining in step S509 that the device type is laser beam printer, in step S510, the print function expansion unit 207 performs editing processing of the PDC 203 corresponding to a case where the device type is laser beam printer. Details of the process of step S510 will be described later with reference to FIG. 8. Upon determining in step S509 that the device type is not laser beam printer, the print function expansion unit 207 ends the processing shown in FIG. 5 without performing editing processing of the PDC 203.

FIG. 6 is a flowchart showing editing processing of the PDC 203 in step S508 corresponding to a case where the device type is inkjet printer. Processes of steps S601 and S602 are processes repetitively performed by the print function expansion unit 207 for each of the candidates of Features added to the PDC 1001 of the printing apparatus 102. In this embodiment, Features added to the PDC 1001 by the print function expansion unit 207 are three: paper size, medium, and paper feed port, as shown in a table 1301. Hence, in this example, the processes of steps S601 and S602 are repetitively executed for the three Features. Note that the print function expansion unit 207 may perform the addition processing for other Features as well.

In step S601, the print function expansion unit 207 decides an Option to be added to the PDC 1001.

Figure 7:
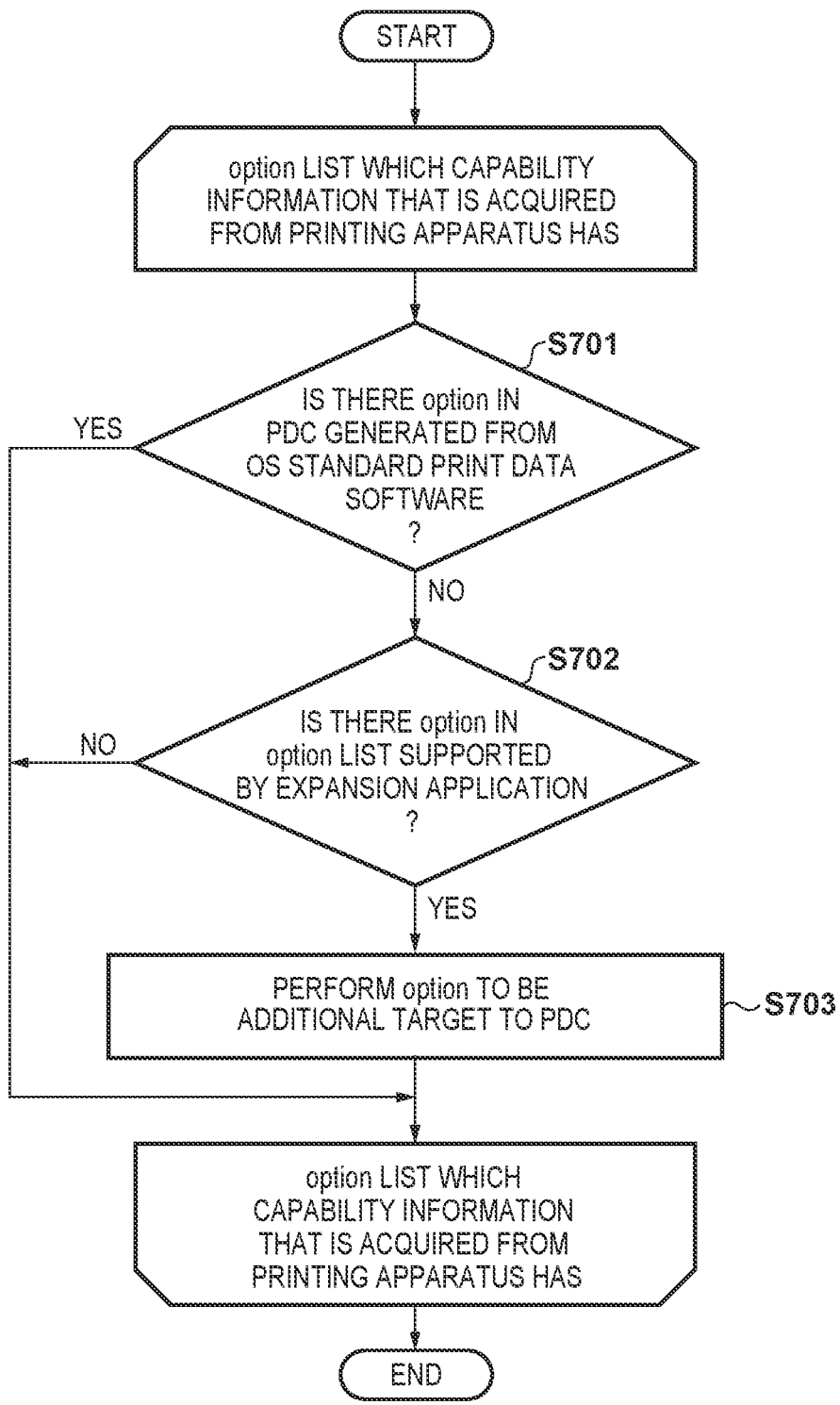
FIG. 7 is a flowchart showing editing processing of a PDC.

FIG. 7 is a flowchart showing processing of the print function expansion unit 207 deciding an Option to be added to the PDC 1001. Processes of steps S701 to S703 are processes performed for each Option candidate of each Feature to be added to the PDC 1001 of the printing apparatus 102 by the print function expansion unit 207. Here, an Option candidate is an Option included in the table 1201 showing the list of capability information that the print function expansion unit 207 acquires from the printing apparatus 102. For example, if the Feature is size, Option candidates are A4, A5, letter, 7×10 inches, and western style No. 6 according to the table 1201.

In step S701, the print function expansion unit 207 determines whether an Option candidate under processing is included in the PDC 1001 of the printing apparatus 102 acquired from the OS 301 in step S503. For example, if the Feature under processing is size, and the Option candidate under processing is A4, it is determined in step S701 that the Option candidate under processing is included because an Option ISOA4 representing A4 is included in the PDC 1001. If it is determined in step S701 that the Option candidate under processing is included, it is judged that addition processing is unnecessary because the Option is already included in the PDC 1001, and the processes of steps S701 to S703 are performed for the next Option candidate.

If it is determined in step S701 that the Option candidate under processing is not included, the process advances to step S702. In step S702, the print function expansion unit 207 determines whether the Option candidate under processing is included in the table 1301 showing the print functions supported by the expansion application 204 and acquired from the shared information 210 of the expansion application 204 in step S502. For example, assume that the Feature under processing is size, and the Option candidate under processing is 7×10 inches. In this case, since 7×10 inches is included in the Options when the Feature is size in the table 1301, it is determined in step S702 that the Option candidate under processing is included. Upon determining in step S702 that the Option candidate under processing is included, in step S703, the print function expansion unit 207 decides the Option under processing as an Option to be added to the PDC 1001 of the printing apparatus 102 acquired from the OS 301. The print function expansion unit 207 temporarily stores the result decided in step S703 in the RAM 113 or the external storage device 114.

Upon determining in step S702 that the Option candidate under processing is not included, the print function expansion unit 207 performs the processes of steps S701 to S703 for the next Option candidate. In this embodiment, for example, if the Feature is size, in step S703, a function that exists in the tables 1201 and 1301 but not in the table 1101 is decided by the print function expansion unit 207 as an Option to be added. That is, as the result in this example, 7×10 inches and western style No. 6 are decided as Options to be added.

Referring back to FIG. 6, in step S602, the print function expansion unit 207 adds the Option decided in step S601 as an Option of the Feature under processing to the PDC 1001 of the printing apparatus 102. By repeating the processes of steps S601 and S602, the print function expansion unit 207 performs, for all Features to perform the addition processing, addition processing of the Option determined to be added in step S703.

In step S603, the print function expansion unit 207 adds conflict information to the PDC 1001 of the printing apparatus 102 acquired from the OS 301. In this embodiment, to decide the conflict information to be added, the print function expansion unit 207 acquires, from the printing apparatus 102, the value of a media-col-database attribute of the response value of the Get-Printer-Attribute operation of the IPP. The media-col-database attribute value includes the information of a combination list that allows the printing apparatus 102 to perform printing in the combination list of Option values settable as print settings.

FIG. 15 schematically shows an example of combination information included in the media-col-database attribute. Values in each column of a table 1501 represent Option values belonging to each Feature, and each row represents one combination. For example, the first row of the table 1501 shows that if a combination of size: A4, paper feed port: auto, and medium: plain paper is designated, printing by the printing apparatus 102 is possible. In the table 1501, three Features including size, paper feed port, and medium are described. However, other Features may be described.

Referring back to FIG. 6, in step S603, the print function expansion unit 207 examines the combinations of all Option values included in the media-col-database acquired from the printing apparatus 102. The print function expansion unit 207 then decides a combination list of Option values with which the printing apparatus 102 cannot perform printing. Furthermore, the print function expansion unit 207 adds, to the PDC 1001, a combination list between two items in the combination list of Option values with which the printing apparatus 102 cannot perform printing. An example of conflict information to be added to the PDC 1001 is conflict information of the combination of paper feed port: main tray and medium: glossy gold, which is a combination not described in the media-col-database 1501.

In step S604, the print function expansion unit 207 deletes, from the PDC 1001, grayscale in the Options of the Feature color mode.

A PDC 1401 shown in FIGS. 14A and 14B is an example of a PDC after the print function expansion unit 207 executes the process of step S508 for the PDC 1001. In the PDC 1401, an Option 1402 such as 7×10 inches concerning the size function, an Option 1403 such as PhotoPaperGlossy concerning the medium function, and additional conflict information 1406 are added to the PDC 1001. An Option 1404 corresponds to the Option 1004. Also, as indicated by an Option 1405, an Option value of grayscale that is a function unnecessary of the printing apparatus 102 is deleted from the PageOutputColor function.

By the above-described processing, if the device type is inkjet printer, addition of Options, addition of conflict information, and deletion of unnecessary Options can be implemented. Note that the print function expansion unit 207 may add or delete Features in addition to Options and conflict information.

Editing processing of the PDC 203 corresponding to a case where the device type of the printing apparatus 102 is specified as inkjet printer in step S510 will be described next. In some cases, a capability information list acquired from the OS 301 in step S501 in a case where the device type of the printing apparatus 102 is specified as laser beam printer is different from the table 1201 shown in FIG. 12. However, the list is not used in the following description, and a detailed description thereof will be omitted. FIGS. 16A and 16B show an example of a PDC of the printing apparatus 102 acquired from the OS 301 in step S503 in a case where the device type of the printing apparatus 102 is laser beam printer. A PDC 1601 includes information supported by the print data generation software 202 in the information of functions (Features) supported by the printing apparatus 102 and the information of set values (Options) for the functions. For example, information 1602 represents that color, monochrome, and grayscale can be designated as PageOutputColor (a color mode in printing). Information 1603 represents that Standard (forward order) and Reverse (reverse order) can be designated as JobPageOrder (print page order). Information 1604 is inhibition information (conflict information) for causing the OS 301 to control to inhibit printing for which two items described therein are simultaneously designated. The example of the PDC 1601 shows that printing for which ISOA5 is designated as the size, and BypassTray is designated as the paper feed port is inhibited by the OS 301. Note that the pieces of information described in the PDC 1601 are merely examples, and other Features, Options, and conflict information may be described.

If the device type of the printing apparatus 102 is laser beam printer, unnecessary Options exist in the PDC 1601. GrayScale that is the Option value of PageOutputColor of the information 1602 is an unnecessary Option value due to the same reason as described concerning step S604. In addition, the printing apparatus 102 whose device type is laser beam printer has a function of controlling the page order on the device side. If Reverse (reverse order) is designated as JobPageOrder of the information 1603, the print data generation software 202 edits the page order of print data to set the reverse order. The printing apparatus 102 cannot know that the page order has already been edited to the reverse order on the side of the host computer 101. For this reason, if the printing apparatus 102 is a laser beam printer, processing of further editing the print data and changing the order of pages is performed. As a result, because of the combination of the operations, the pages are not printed correctly in the reverse order. Hence, if the printing apparatus 102 is a laser beam printer, Reverse that is the Option value of JobPageOrder of the information 1603 is deleted by processing to be described later. As a result, designation of reverse order setting can be inhibited on a GUI provided by the print setting screen expansion unit 205.

In addition, in the printing apparatus 102 whose device type is laser beam printer, a printable combination is decided by Option values of three or more Features. That is, conflict information is formed by a combination of Options of three or more Features. If conflict information formed by three or more Features is described in the information 1604 of the PDC 1601, all pieces of combination information need to be described. As a result, the amount of information is enormous, and the conflict processing time is long.

Figure 8:
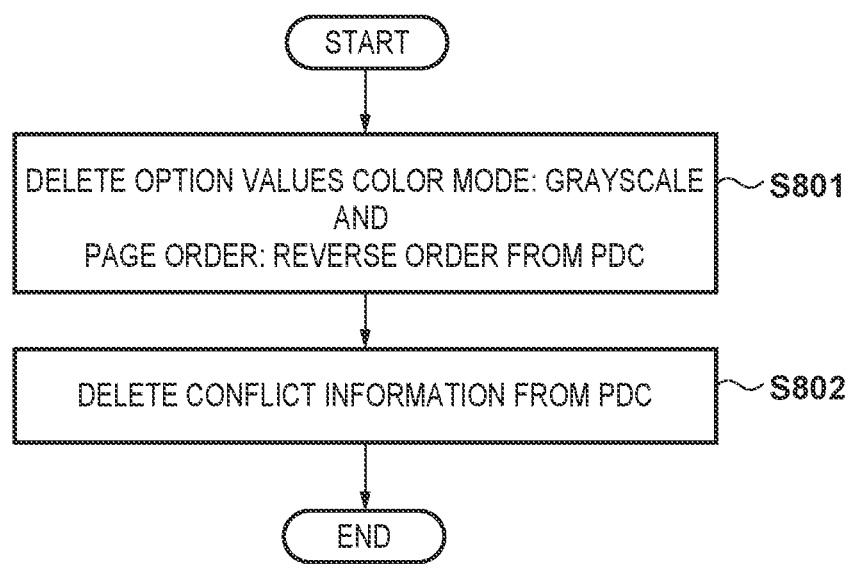
FIG. 8 is a flowchart showing editing processing of a PDC.

FIG. 8 is a flowchart showing editing processing of the PDC 203 corresponding to a case where the device type is laser beam printer in step S510. In step S801, the print function expansion unit 207 deletes unnecessary Options described in the PDC 1601 of the printing apparatus 102 acquired from the OS 301. More specifically, the print function expansion unit 207 deletes GrayScale that is the Option value of PageOutputColor of the information 1602, and Reverse that is the Option value of JobPageOrder of the information 1603.

In step S802, the print function expansion unit 207 deletes the conflict information 1604 described in the PDC 1601. A PDC 1701 in FIGS. 17A and 17B shows an example of a PDC after the editing processing shown in FIG. 8 is performed. The above is the detailed description of the process of step S510.

As described above, in this embodiment, the function of the print data generation software 202 can be expanded by the processing of the expansion application 204. The expansion application 204 edits the PDC 203 based on the capability information 302 acquired from the printing apparatus 102 connected to the host computer 101, thereby expanding the function in accordance with the capabilities of the connected printing apparatus 102. Also, the expansion application 204 can specify the device type of the printing apparatus 102 based on information included in the capability information 302 acquired from the printing apparatus 102. Based on the specified device type, the expansion application 204 switches editing processing of the PDC 203 to different processing for each device type and executes it. For example, if the device type is inkjet printer, the expansion application 204 adds conflict information to the PDC 203 in step S603. If the device type is laser beam printer, the expansion application 204 deletes conflict information from the PDC 203 by the process of step S802. These processes cannot be implemented only by reflecting the capability information 302 acquired from the printing apparatus 102 on the PDC 203. By these processes, the expansion application 204 can implement optimum function expansion processing in accordance with the connected printing apparatus 102 and the device type thereof.

In FIG. 5, processing is switched between two device types, that is, inkjet printer and laser beam printer. A plurality of device types may further be specified, and processing may be switched in accordance with the specified device type. For example, upon judging that the printing apparatus 102 uses cloud connection, as shown in step S905, the expansion application 204 may execute editing processing of the PDC 203 optimum for cloud connection.

With the above-described configuration, according to the expansion application 204 of this embodiment, it is possible to implement optimum function expansion processing by one expansion application 204 without providing a different expansion application 204 in accordance with the connected printing apparatus 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-122018, filed Jul. 29, 2022, which is hereby incorporated by reference herein in its entirety.

What is claimed is:

1. A non-transitory computer-readable storage medium storing an application program supporting a software program corresponding to a printing apparatus, the application program causing a computer of an information processing apparatus which communicates with the printing apparatus to function as:
    a first acquisition unit configured to acquire function information of the printing apparatus, the function information being created by the software program;
    a second acquisition unit configured to acquire a type of the printing apparatus;
    an editing unit configured to edit the function information acquired by the first acquisition unit;
    a determining unit configured to determine whether the type of the printing apparatus acquired by the second acquisition unit is a printing apparatus using an inkjet printing method or a printing apparatus using an electrophotographic method; and
    a control unit configured to control the editing unit such that editing processing for the function information acquired by the first acquisition unit changes based on a determination result by the determining unit.

2. The non-transitory computer-readable storage medium according to claim 1, wherein
    the computer is further caused to function as a third acquisition unit configured to acquire function information of the printing apparatus supported by the application program, and
    the control unit controls the editing unit such that at least a part of the function information acquired by the third acquisition unit is added to the function information acquired by the first acquisition unit.

3. The non-transitory computer-readable storage medium according to claim 2, wherein
    the computer is further caused to function as a fourth acquisition unit configured to acquire function information from the printing apparatus, and
    the control unit controls the editing unit based on the function information acquired by the fourth acquisition unit such that at least the part of the function information acquired by the third acquisition unit is added to the function information acquired by the first acquisition unit.

4. The non-transitory computer-readable storage medium according to claim 3, wherein the acquisition by the fourth acquisition unit is executed via communication of a predetermined protocol with the printing apparatus.

5. The non-transitory computer-readable storage medium according to claim 4, wherein the predetermined protocol is the Internet Print Protocol (IPP).

6. The non-transitory computer-readable storage medium according to claim 2, wherein the information added to the function information acquired by the first acquisition unit in a case where it is determined by the determining unit that the type of the printing apparatus acquired by the second acquisition unit is the printing apparatus using the inkjet printing method includes at least one of a size of a print medium, a paper feed port, a type of a print medium, and conflict information in a print setting.

7. The non-transitory computer-readable storage medium according to claim 1, wherein the control unit controls such that the editing unit deletes a part of the function information acquired by the first acquisition unit.

8. The non-transitory computer-readable storage medium according to claim 7, wherein the information deleted from the function information acquired by the first acquisition unit in a case where it is determined by the determining unit that the type of the printing apparatus acquired by the second acquisition unit is at least one of the printing apparatus using the inkjet printing method and the printing apparatus using the electrophotographic method includes information of a color mode.

9. The non-transitory computer-readable storage medium according to claim 7, wherein the information deleted changes in accordance with the type of the printing apparatus acquired by the second acquisition unit.

10. The non-transitory computer-readable storage medium according to claim 9, wherein the information deleted from the function information acquired by the first acquisition unit in a case where it is determined by the determining unit that the type of the printing apparatus acquired by the second acquisition unit is the printing apparatus using the electrophotographic method includes at least one of an order of pages, information of a color mode, and conflict information in a print setting.

11. The non-transitory computer-readable storage medium according to claim 1, wherein the acquisition by the second acquisition unit is executed via communication of a predetermined protocol with the printing apparatus.

12. The non-transitory computer-readable storage medium according to claim 11, wherein the predetermined protocol is the Internet Print Protocol (IPP).

13. The non-transitory computer-readable storage medium according to claim 1, wherein the function information edited by the editing unit is used for display of a user interface screen.

14. The non-transitory computer-readable storage medium according to claim 13, wherein the user interface screen is a print setting screen.

15. The non-transitory computer-readable storage medium according to claim 1, wherein the first acquisition unit acquires the function information of the printing apparatus based on associating the application program with the software program.

16. The non-transitory computer-readable storage medium according to claim 1, wherein the software program is a driver that is included in an OS and operates based on a standard protocol.

17. An information processing apparatus comprising:
at least one processor; and
at least one memory coupled to the at least one processor, the at least one memory storing an application program supporting a software program corresponding to a printing apparatus, the application program including instructions, which when executed by the at least one processor, cause the at least one processor and the at least one memory of the information processing apparatus which communicates with the printing apparatus to act as:
a first acquisition unit configured to acquire function information of the printing apparatus, the function information being created by the software program;
a second acquisition unit configured to acquire a type of the printing apparatus;
an editing unit configured to edit the function information acquired by the first acquisition unit;
a determining unit configured to determine whether the type of the printing apparatus acquired by the second acquisition unit is a printing apparatus using an inkjet printing method or a printing apparatus using an electrophotographic method; and
a control unit configured to control the editing unit such that editing processing for the function information acquired by the first acquisition unit changes based on a determination result by the determining unit.

18. A method executed in an information processing apparatus which communicates with a printing apparatus, the information processing apparatus storing an application program supporting a software program corresponding to the printing apparatus, the method comprising:
acquiring function information of the printing apparatus, the function information being created by the software program;
acquiring a type of the printing apparatus;
editing the acquired function information;
determining whether the acquired type of the printing apparatus is a printing apparatus using an inkjet printing method or a printing apparatus using an electrophotographic method; and
controlling such that editing processing for the acquired function information changes based on a determination result in the determining.

* * * * *